Jan. 16, 1940.   J. W. ANDERSON   2,187,582
MIRROR CONSTRUCTION
Filed Nov. 24, 1937
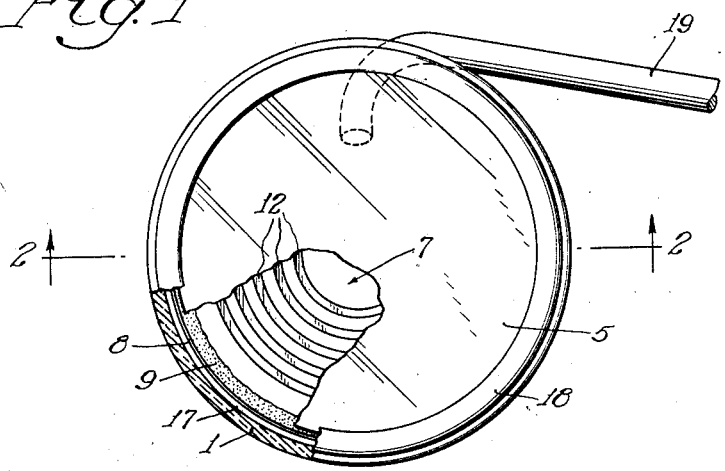
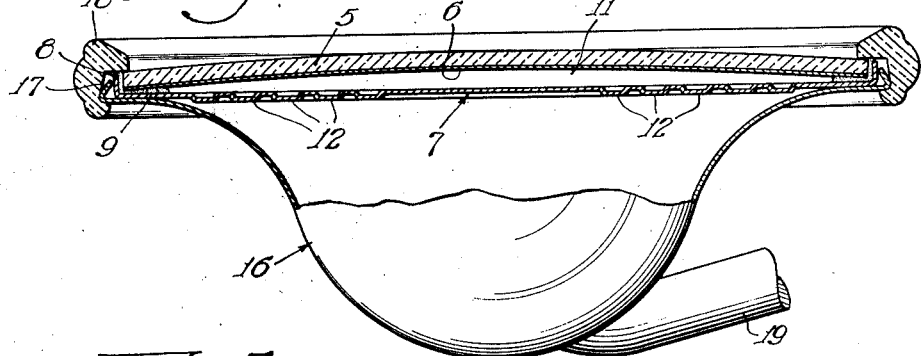
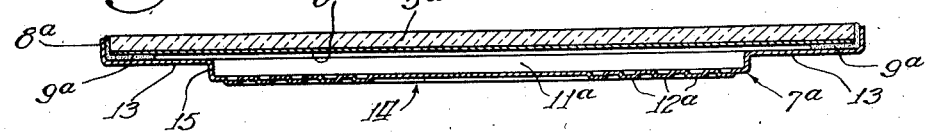
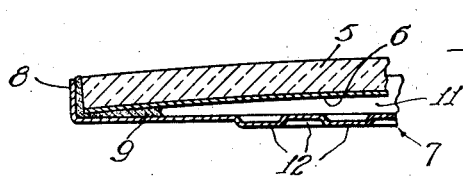
Witness:
V. Silgander
Inventor:
John W. Anderson
By: Hill & Hill
Attys.

Patented Jan. 16, 1940

2,187,582

UNITED STATES PATENT OFFICE 2,187,582

MIRROR CONSTRUCTION

John W. Anderson, Gary, Ind., assignor to Productive Inventions, Inc., Gary, Ind., a corporation of Indiana Application November 24, 1937, Serial No. 176,249

4 Claims. (Cl. 88—96)

This invention relates to mirror construction and particularly to a novel construction and arrangement providing for hermetically sealing and protecting the reflecting surfaces of mirrors, particularly, when exposed to outside atmospheric conditions, as, for example, in the case of outside rear view mirrors for motor vehicles.

It is a well known fact that when mirrors are exposed to weather conditions such, for example, as moisture and varying changes in temperature, the silvered back providing the reflecting surface deteriorates until it is thereby rendered ineffective, even when a coating of paint, or the like, has been applied thereto.

It has been observed also that when a mirror, intended for use, particularly, under outside atmospheric conditions, is placed in a support or backing member in such a manner that an air space or chamber is formed adjacent the silvered portion of the mirror, there occurs what might be termed a "breathing" action of the structure by reason of the arrangement of the mirror and backing member. This "breathing" action is due to expansion and contraction of the air in the chamber, brought about by changes in temperature, and, unless the chamber is effectually sealed, when the air in the chamber contracts, outside air is drawn into the hollow chamber formed by the mirror and its support or backing member.

Moisture-laden air drawn into the chamber or air space and permitted to condense on the back of the mirror attacks the silver, even when painted, and destroys the reflecting quality of the silver. Various costly processes and materials have been employed in the manufacture of mirrors, to retard such destruction.

One object of the present invention, therefore, is to provide a novel construction and arrangement whereby the silver or other reflecting material of a mirror is effectually protected against the deteriorating effects of atmospheric conditions.

Another object of the invention is to provide an efficient seal adjacent the edge and back portion of a mirror for protecting the reflecting material thereof.

Another object of the invention is to provide a backing member adjacent the rear side of a mirror and a weather-tight connection adjacent the edge portions of the mirror and backing member.

Another object of the invention is to provide a novel structure wherein a backing member is spaced, throughout a substantial portion thereof, from a mirror, and wherein moisture is excluded from the space or chamber formed between said member and mirror.

Another object of the invention is to provide a novel construction and arrangement whereby the space adjacent the silvered portion of a mirror mounted in a hollow or shell-like support or carrier is sealed-off from the space on the interior thereof.

Another object of the invention is to provide a novel construction and arrangement whereby stresses of air pressure due to temperature changes in the air space or chamber adjacent the mirror and backing member are readily absorbed, thus protecting the seal or connection between the mirror and the backing member against strain or possible rupture of the sealing material at any point of least resistance.

Another object of the invention is to provide a novel construction and arrangement whereby the seal or connection between the mirror and backing member is protected against strains due to the relatively different coefficients of expansion and contraction in the materials of which the mirror and backing members are constructed.

A further object of the invention is to provide a novel construction and arrangement designed to facilitate testing of the assembled device for possible leaks adjacent the edge portion thereof.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is an elevational view of a mirror construction and support therefor embodying features of the present invention, portions thereof being broken away to illustrate more clearly certain novel structure and arrangement forming part of the invention;

Fig. 2 is an enlarged sectional elevational view of the structures illustrated in Fig. 1, and taken substantially as indicated by the line 2—2 thereof;

Fig. 3 is a further enlarged fragmentary sectional elevational view of a portion of the mirror structure, backing member and sealing material associated therewith for providing a hermetic seal between the mirror and backing member adjacent the edge portions thereof; and Fig. 4 is a sectional view of a slightly modified construction contemplated within the concept of the present invention.

As illustrated in Figs. 1 to 3 of the accompanying drawing, the mirror construction of the present invention comprises, preferably, a curved, convex or "panoramic" mirror indicated, as a whole, by the numeral 5 having a coating 6 of silver or other suitable reflecting material on one side thereof and adapted to be secured adjacent a backing member or plate indicated, as a whole, by the numeral 7, shown, in the present instance, as of substantially flat metallic structure formed, preferably, of thin, flexible, resilient material such as copper, or the like, which may be flexed slightly and adapted to resist actions resulting from changes in atmospheric conditions.

As clearly illustrated in Figs. 2 and 3, the backing member 7, in the present instance, is provided adjacent its edge portion with a laterally extending annular flange 8 within which the mirror 5 is adapted to be positioned, preferably, in a manner to provide a slight clearance between the inner face of the flange and edge portion of the mirror.

For securing the mirror 5 to the backing member 7 and for sealing the adjacent edge portions thereof to protect the reflecting material 6 from disintegration or deterioration due to moisture or the like coming in contact with the reflecting material 6 as a result of changing atmospheric conditions, a sealing material 9 such, for example, as a pliable cementitious material or compound, preferably of a structure which will neither harden nor run under extreme changes in normal atmospheric temperature conditions, is positioned on the inner side of the backing member 7 adjacent the flange 8 as illustrated in Figs. 2 and 3, and the mirror 5 pressed into the sealing material in a manner to force a portion of the sealing material between the edge of the mirror and the flange to provide an efficient hermetic seal adjacent the edge portions of the mirror 5 and backing member 7.

It is to be understood that in the specification and the claims, the terms "pliable sealing means" or "pliable cementitious means" refer to a cementitious sealing compound which has sufficient adhesion and elasticity to permit expansion and contraction of the mirror and the backing member without disrupting the seal.

It will be noted, particularly by reference to Fig. 2, that by reason of the curved form of the mirror 5 and the substantially flat character of the backing member 7, as in the present structure, an air space or chamber 11 is provided between the mirror and backing member. When a flat mirror is substituted for the convex mirror, such chamber may be provided by offsetting the backing member, as shown in Fig. 4.

As is well known, air will contract and expand with changes in temperature, and to compensate for the expansion of air in the chamber 11, the backing member or plate 7 is provided with a plurality of alternating substantially parallel ribs and grooves shown, in the present instance, as extending annularly around the central portion of the backing plate and providing radially disposed corrugations 12 in the body portion of the plate. Such a construction and arrangement contributes materially to the ease with which the backing member may flex in a manner to readily absorb any stresses or strains resulting from excessive air pressure in the chamber 11 due to changes in temperature or other causes, thereby protecting the seal or connection adjacent the edge portions of the mirror and backing member against strain and possible rupture of the sealing material 9, a condition, which, obviously, would result in the admission of moisture to the chamber 11 and the eventual destruction of the reflecting material 6 of the mirror.

This construction and arrangement of the corrugations 12 formed in the backing member 7 also compensates for the relatively different coefficients of expansion and contraction in the materials of which the mirror and backing member are constructed, thereby eliminating the probability of relative movement of portions of the mirror and backing member adjacent the sealing material 9, a condition which might also result in an improper seating of the mirror in the sealing material and an inefficient sealing connection adjacent the edge portions of the mirror and backing member.

Owing to the resilient character of the material forming the backing member 7, and the novel construction and arrangement characterizing the present invention, it will be apparent that in testing the assembled structure for leaks, the device may be submerged in water and by pressing or flexing the body portion of the member 7 inwardly, the air within the space between the mirror and backing member will be forced out through any opening or leak which might exist in the seal adjacent the edge portion of the mirror, and through which moisture might enter the said space and destroy or cause deterioration of the silver 6 or other reflecting material of the mirror.

By such an arrangement, the efficiency of the seal may be readily ascertained, and the device rejected or accepted for use, depending upon the result of the test.

Fig. 4 illustrates a substantially flat mirror 5a having a reflecting material 6a on one side thereof and provided with a backing member indicated, as a whole, by the numeral 7a, the backing member, in the present instance, having an outer portion 13 adapted to be positioned adjacent the edge portion of the mirror 5a and having a flange 8a formed on the portion 13 adapted to surround the edge portion of the mirror. The backing member 7a is also provided with a central portion 14 offset with respect to the plane of the outer portion 13, as indicated at 15, and provided with a plurality of radially spaced corrugations 12a arranged in a manner similar to the structure illustrated in Figs. 1 to 3 of the drawing. It will be observed that by such an arrangement, a chamber 11a will be provided between the mirror 5a and inner portion 14 of the backing member 7a, and that by positioning a sealing material 9a between the adjacent portions of the flange 8a, mirror 5a and outer portion 13 of the backing member, the chamber 11a and reflecting material 6a will be sealed off and protected against actions resulting from changes in outside atmospheric conditions, it being understood that, if desired, mirrors of convex form may be also used with the form of backing member shown in Fig. 4.

For mounting the mirror and backing member within a suitable support or carrier, a hollow shell-like casing 16 may be provided, having an open side portion and flange 17 formed thereon, extending around the open side thereof. The said flanged or open side of the carrier is adapted to receive the mirror 5 and backing member 7, as illustrated in Fig. 2, the assembled mirror, backing member and support or carrier 16 being secured together at their adjacent edge portions by means of a ring-like member 18 suitably mounted on the assembled structure.

A device of the character disclosed is particularly applicable to an outside rear view mirror mounting for automobiles or the like, and when so used, the support or carrier 16 may be provided with an arm 19 by which the mirror and support therefor may be conveniently attached to a vehicle.

It will be observed from the foregoing description that the present invention provides a novel construction and arrangement in mirror mountings whereby the reflecting surface of the mirror is efficiently protected against the deteriorating effect of varying atmospheric conditions thereby prolonging the life of mirrors so constructed and protected.

Obviously, the present invention is not limited to the precise construction and arrangement shown and described as the same may be variously modified without departing from the spirit and scope of the invention as set forth in the appended claims.

What I claim as new and desire to secure by Letters Patent is:

1. In a device of the class described and in combination, a circular mirror, a substantially circular plate backing member therefor having a laterally extending annular flange adapted to surround the edge of said mirror, said member having a flexible inner portion offset from the plane of said outer portion, a pliable sealing material between adjacent peripheral portions of said mirror, flange and backing member, a hollow shell-like support for said mirror having an open side portion, a flange on said support extending around said side portion adjacent the opening therein and adapted to receive said backing member, and a ring for securing said support and backing member together.

2. In a device of the class described and in combination, a mirror, a backing member having a laterally extending annular flange adapted to surround the edge of said mirror, a plurality of annular ribs and grooves formed in said backing member providing corrugations in spaced relation to said flange and extending substantially parallel thereto, said flange forming an angle adjacent the outer portion of said backing member, a pliable sealing material in said angle between adjacent portions of the backing member, flange and mirror, a hollow support having an open side portion adapted to receive said backing member, and means adjacent the edge portions of said member and support for securing the mirror and backing member in the open side portion thereof.

3. In a device of the class described and in combination, a mirror, a plate backing member located in superposed relation to said mirror and having a laterally extending annular flange overlying at least a portion of the edge of said mirror, and pliable cementitious means for sealing the peripheral portions of said mirror and said backing member, the portion of the backing member inwardly of the sealing means being spaced from the mirror to form a chamber therebetween and being free to flex in either direction without disturbing said sealing means.

4. In a device of the character described and in combination, a circular mirror, a flexible circular plate backing member having a peripheral flange overlying the edge of said mirror, and pliable sealing means located between said flange and the peripheral portions of the mirror and the backing member, the portions of the backing member inwardly of said sealing means being spaced from the mirror to form a chamber therebetween, said inward portions of said backing member being weakened against resistance to axial flexing movement.

JOHN W. ANDERSON.